United States Patent
Hoornaert et al.

(10) Patent No.: US 8,347,096 B2
(45) Date of Patent: Jan. 1, 2013

(54) AUTHENTICATION TOKEN WITH INCREMENTAL KEY ESTABLISHMENT CAPACITY

(75) Inventors: Frank Hoornaert, Bertem (BE); Frederik Mennes, Brecht (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 450 days.

(21) Appl. No.: 12/501,131

(22) Filed: Jul. 10, 2009

(65) Prior Publication Data

US 2011/0010552 A1 Jan. 13, 2011

(51) Int. Cl.
*H04L 29/06* (2006.01)
*H04L 9/00* (2006.01)

(52) U.S. Cl. ........ 713/172; 713/166; 713/167; 713/168; 713/169; 713/170; 726/5; 726/6; 726/7

(58) Field of Classification Search .................... 713/172
See application file for complete search history.

(56) References Cited

U.S. PATENT DOCUMENTS

| | | | |
|---|---|---|---|
| 4,599,489 A | 7/1986 | Cargile | |
| 4,609,777 A | 9/1986 | Cargile | |
| 4,819,267 A | 4/1989 | Cargile et al. | |
| 6,173,400 B1 * | 1/2001 | Perlman et al. | 713/172 |
| 2004/0172535 A1 * | 9/2004 | Jakobsson et al. | 713/168 |
| 2008/0082824 A1 | 4/2008 | Brahim et al. | |

* cited by examiner

*Primary Examiner* — Longbit Chai
(74) *Attorney, Agent, or Firm* — RatnerPrestia

(57) ABSTRACT

The present invention relates to the field of strong authentication tokens and more specifically to methods and apparatus employing cryptographic key establishment protocols for such strong authentication tokens.

An apparatus comprising storage for a secret key, said secret key for use in the generation of cryptographic values, and a cryptographic agent for generating said cryptographic values using said secret key, selects one of a predetermined set of key transformations in an unpredictable way and applies said selected key transformation to said secret key prior to generating one of said cryptographic values.

A server receives and authenticates a credential generated using a transformed secret and derives the transformed secret, by generating a plurality of verification values using a set of known permitted transformations of a stored secret, determining whether said credential matches one of said plurality of verification values, and, if said credential matches one of said plurality of verification values, storing the corresponding one of said set of known permitted transformations as an updated value for said stored secret.

26 Claims, 2 Drawing Sheets

AUTHENTICATION TOKEN WITH INCREMENTAL KEY ESTABLISHMENT CAPACITY

TECHNICAL FIELD

The present invention relates to the field of strong authentication tokens and more specifically to methods and apparatus employing cryptographic key establishment protocols for such strong authentication tokens.

BACKGROUND ART

Strong authentication tokens are well known in the art. They allow service providers and applications to authenticate the possessor of the token, by providing credentials that could only be generated with knowledge of a secret or key that is shared between the authentication server employed by the service provider or application on the one hand, and the authentication token on the other hand. To generate credentials, the authentication token applies a cryptographic algorithm to the shared secret and a variable, for example comprising one or more of a counter value, a value representing the present time, and a challenge or data representing the ongoing session or transaction. The credential thus generated serves as a one-time password, or, if transaction data is included in its calculation, an electronic signature.

The authentication server performs the same or a complementary calculation to obtain a verification value, using its own copy of the shared secret, and its locally kept value of the counter, the present time, the challenge it submitted to the end user or the relevant transaction related data. Authentication is successful if the token-generated credential submitted by the end user matches the verification value generated by the authentication server.

Typical strong authentication tokens have a display for communicating the credentials to the end user, and a button or keypad to request the generation of a new credential and/or to enter challenges, transaction data, PIN codes, etc. Other known communicating means include auditory output, USB interfaces, and wireless interfaces. Other known input means include optical sensors, USB interfaces, and wireless interfaces.

Some strong authentication tokens are dedicated hardware devices whose only or main function is to generate authentication credentials, while other tokens are devices having general purpose computing capabilities (for example Personal Computers, Personal Digital Assistants, cell phones) that run software emulating the functions of dedicated hardware strong authentication tokens and that often offer the generation of authentication credentials merely as an additional functionality besides other functionalities. The latter kind of token is sometimes referred to as a software token.

In a first class of strong authentication tokens, the secret is embedded in a memory internal to the token itself, which is typically made inaccessible to the outside world.

In a second class of strong authentication tokens, the token is capable of receiving an external component carrying a secret, such as a smart card, and of cooperating with this external component to generate and provide credentials.

An advantage of the strong authentication tokens of the second class is that they can be completely generic until the external component is added. This implies that the manufacturing, inventory management, and distribution processes for such strong authentication tokens are similar to the processes for any other kind of non-individualized electronic apparatus, without special requirements for keeping track of the whereabouts of individual items.

Nevertheless, situations may occur where it is desirable to have a token combining the advantages of both worlds, i.e. a strong authentication token with a secret embedded in the device itself, which is still capable of being manufactured as a generic item.

DISCLOSURE OF THE INVENTION

Technical Problem

One way of providing a strong authentication token with a secret embedded in the device itself, which is still capable of being manufactured as a generic item, is to personalize the token after distribution to the end user, before its first use. A disadvantage of this method is that it requires entering a key seed into the device, which must typically be done manually by the end user (e.g., via the keypad). There are two requirements which have a conflicting impact on the size of the data entered by the end user. On the one hand there is a requirement to maximize the user convenience which means that the amount of data to be entered by the end user should be minimized. In practice it may be considered impractical for the end user to enter a key seed providing more than approximately 40 bits of entropy for the cryptographic key. On the other hand there is a requirement to maximize the security by maximizing the entropy of the key. A minimum of 80 bits of entropy is often recommended for cryptographic keys to provide acceptable resistance to so-called brute-force attacks. In order to obtain such a high-quality shared secret, i.e. a shared secret with a high degree of entropy, the amount of data that must be entered by the end user would have to be so large that this method would become inconvenient.

Hence, there is a need for a more convenient way to personalize strong authentication tokens after distribution to the end user.

Technical Solution

The present invention is based on the insight that although a high-quality shared secret requires exchanging relatively large amounts of key material between the authentication server and the strong authentication token in a secure way, there is no need to exchange all that material in one single transaction. The present invention solves the problem of post-distribution personalization of strong authentication tokens, by implementing an incremental key establishment protocol.

Firstly, the invention relies on the fact that the shared secret need not be constant in time, as long as the authentication server and the strong authentication token are synchronized, i.e. both sides know what the current version of the shared secret is.

Secondly, the invention relies on the fact that if the strong authentication token modifies the shared secret within predetermined bounds, an authentication server receiving a credential generated with the modified version of the shared secret would be able to verify the credential while reconstructing the modified shared secret, simply by trying out the limited number of permitted modifications of the shared secret.

Thirdly, the invention relies on the fact that a series of random (or pseudo-random or otherwise, in a practical sense, unpredictable) but bounded modifications as described above may, over time, remove any correlation that might have existed between the keys stored in different strong authentication tokens.

Based on these premises, the personalization problem can be addressed efficiently in the following way. Users are provided with strong authentication tokens that at some point in time are given an initial secret that for some reason is considered to have a weakness or represent a potential security risk. For example they may be generic tokens that all contain an identical pre-programmed secret such that the compromise of that single secret would potentially impact all users, or they may be tokens that are seeded by the end user with a minimum of user-specific secret key material with relatively low entropy. For at least some of the subsequent generations of a credential by the strong authentication token, the token changes the secret prior to the generation of the credential, each such change being randomly (or pseudo-randomly or in some other way that is in a practical sense unpredictable) selected from a limited set of permitted changes. Upon submission of a credential to the authentication server, the authentication server generates a verification value for each of the permitted changes to the shared secret. If any of the verification values matches the received credential, authentication is successful and the corresponding version of the changed shared secret is stored as the new shared secret. If none of the verification values matches the received credential, authentication is unsuccessful and the stored shared secret remains unchanged.

The process of changing the secret may terminate as soon as a predetermined condition has been met, such as reaching a target level of entropy or statistical distance from the initial secret. Alternatively, the process of changing the secret may be continued indefinitely. The latter may be preferable if at any credential generation there is a non-zero probability that an attacker can observe the generated credential.

In one embodiment the selection of the secret key change from a limited set of permitted changes may be done in a true random way. In another embodiment the selection is done in a pseudo-random way or in some other way that is in a practical sense unpredictable for an attacker trying to retrieve the secret key. In the remainder of the text the terminology 'random' shall be understood to encompass not only true randomness but also weaker forms of unpredictability, unless otherwise noted.

In a preferred embodiment the confidentiality of at least some of the generated credentials is protected e.g. by communicating said credentials to the authentication server over a secure channel such as for example a TLS or SSL connection.

In some embodiments the shared secret is a key that is used directly to generate or verify credentials. In other embodiments the shared secret is secret data that is used indirectly e.g. in the derivation of a session key that is used for the generation or verification of the credentials. In the remainder of the text 'shared secret key' shall be understood to encompass all secret data shared between the token and the authentication server that is used to determine the value of the session key that is used to generate or verify the credentials.

In some embodiments a verification value and the received credential match if they are equal. In other embodiments they may match if they satisfy some predefined relation. In one embodiment a verification value may match the received credential if it equals a certain value that is calculated from the received credential. For example in case the last stage of generating the credential involves scrambling, the received credential may be unscrambled by the authentication server and a match occurs if the verification value equals the unscrambled credential.

The use of time-based strong authentication tokens, i.e. strong authentication tokens that use a value derived from an internal clock in the generation of credentials, typically requires a synchronization mechanism on the side of the authentication server. This is due to the fact that the clocks inside the tokens have limited accuracy, and because the time between generation of the credential and receipt of the credential may vary. One way of dealing with the synchronization issue is to calculate, at the authentication server, different verification values corresponding to different time values within a small window around the "actual time value". In this manner, successful authentication may still take place despite a small amount of desynchronization. The "actual time value" as used here, is the time value obtained from the authentication server's internal clock, offset by a particular amount for each individual token. This offset may be updated whenever the synchronization algorithm indicates that the presently stored "actual time" no longer corresponds to the time apparently used by a given strong authentication token.

The same reasoning applies to the use of event-based strong authentication tokens, i.e. strong authentication tokens that use a value derived from an internal counter in the generation of credentials. Here, the problem is that the end user may have generated credentials that were never submitted to the authentication server, thus creating a divergence between the value of the counter stored at the authentication server, and the value of the counter stored in the strong authentication token. More particularly, under these circumstances, the value of the counter stored in the strong authentication token will be greater than or equal to the value stored in the authentication server (barring the possibility of counter overflow). Again, a synchronization algorithm may be implemented at the side of the authentication server, which comprises calculating different verification values corresponding to different counter values within a small window starting from the server-side counter value. The server-side counter value corresponding to any given strong authentication token may be updated whenever the synchronization algorithm indicates that the presently stored counter value no longer corresponds to the counter value apparently used by the strong authentication token.

The mechanism of the present invention may seem similar to the synchronization scheme presented above, in that it, too, comprises "testing" a number of candidate verification values, and updating a token-specific data element upon identifying the correct candidate. However, the invention differs from the synchronization mechanism in a number of important aspects. Firstly, whereas it is the goal of the synchronization mechanism to be able to deal at the server side with potential ambiguity on the exact value of the input variable that has been used by the authentication token in generating the credential whereby there is no need for confidentiality of said exact value, it is the goal of the present invention to communicate transformations of a shared secret key by the authentication token to the server in a secure and confidential way. Secondly, the strong authentication token according to the present invention comprises a novel transformation agent adapted to transform the stored shared secret key according to a randomly selected one of a set of permitted transformations. Thirdly, rather than expecting to be able to verify the credential with the "last known good parameters" (the stored time offset or counter value), and going into the synchronization algorithm as a fall-back, the authentication server according to the invention now performs the steps to determine the applied transformation by default. Ordinarily, there is no need to check whether the "last known good secret" was used, and if it is found that a secret is being reused, this should not lead to successful authentication.

Hence, it is clear that the features of the present invention may be applied to a time-based or event-based strong authentication token, as a result of which both the abovementioned synchronization algorithms and the secret transformation mechanism of the present invention would be performed by the authentication server. If the credential generation process is only based on a challenge or transaction data, a synchronization mechanism as described above is unnecessary, which clearly reduces the number of candidate credentials that would lead to successful authentication, hence also reducing the risk of a false positive authentication.

In practice not every credential that is generated by an authentication token will be submitted to the authentication server. In that case the authentication token may have applied a transformation to its copy of the shared key while the server is unaware of this and as a consequence will not have applied the same transformation to its own copy of the shared key. In this way the copies of the shared key at the token and at the server can become de-synchronized. This problem can be remedied in a number of ways.

Optionally, if application of the transformation mechanism of the present invention does not result in a successful authentication, the authentication server may apply a second set of permitted transformations to each of the first set of permitted transformations, thus squaring the number of candidate verification values, and repeat the authentication attempt with the verification values thus obtained. Doing this allows the authentication server to detect a situation where a credential was generated by the strong authentication token, and a transformation was applied to the token's secret, without notification to the authentication server. However, repeating this approach for multiple "missing credentials" quickly raises the number of credential values that the server deems acceptable, which may have an adverse impact on the security level.

In an alternative solution, the token does not apply the key transformation on every credential generation. For example in one embodiment, the token only applies the key transformation if it has generated at least N credentials without applying the key transformation (where N is positive integer which is a parameter of the token, for example having the value '4'). Since it is sufficient for the server to receive at least one credential generated with the transformed key to be able to track the key transformation, the server may miss up to N−1 consecutively generated credentials without risk of desynchronization.

In another embodiment, the token only applies the key transformation if a certain minimum amount of time (for example a day) has passed since the last key transformation. This may be particularly useful in cases where the end-user 'plays' with the token and generates in a short time frame many credentials one after the other without actually presenting the generated credentials to the server.

In one embodiment, for example if it is acceptable to assume that a potential attacker will in general not be able to observe all credentials submitted to the authentication server, the token may include in the credential an indication which permitted transformation it has selected.

Although the invention has so far been described only in the context of strong authentication tokens, it will be clear to a person skilled in the art that the same method can be used with any pair of entities that share a secret key and whereby one entity makes a change to its copy of the shared key and the other entity needs to make the same change to its own copy of the shared key. One embodiment of the invention can therefore be described in more general terms as a method for entities sharing a secret key to communicate a transformation by a first of said two entities of said shared secret key from said first entity to a second of said entities; said method comprising the steps of: said first entity selecting said key transformation from a limited set of permitted key transformations; said first entity generating a cryptographic value with said transformed secret key; said cryptographic value being submitted to said second entity; said second entity generating a number of candidate verification values using candidate secret key values obtained by applying transformations from said limited set of permitted key transformations to its own copy of the shared secret key and comparing at least one of said candidate verification values with said cryptographic value generated by said first entity; and, if one of said candidate verification values matches said cryptographic value generated by said first entity, said second entity retaining as the new value for its own copy of the shared secret key one of said candidate secret key values whose corresponding candidate verification value matches said cryptographic value generated by said first entity.

Advantageous Effects

A token in accordance with the present invention combines the advantages of strong authentication tokens with a secret embedded in the device itself, with the possibility of manufacturing and distributing the tokens as generic items.

A batch of strong authentication tokens with initially identical secrets will, once they are put to use, diffuse into a set of tokens with mutually distinct secrets, thus mitigating the potential consequences if the initial secret ever gets compromised.

The secret of a software token derived from a seed with low entropy manually provided by an end-user will gradually change into a secret with a higher level of entropy, thus becoming harder to guess by an exhaustive search for an attacker that was not able to observe all generated credentials. This may for example be the case when at least some of the credentials are communicated to the server over a secure channel such as for example an SSL or TLS connection.

BRIEF DESCRIPTION OF THE DRAWINGS

The foregoing and other features and advantages of the invention will be apparent from the following, more particular description of several embodiments of the invention, as illustrated in the accompanying drawings.

MODE(S) FOR CARRYING OUT THE INVENTION

A strong authentication token is often provided in the form of a handheld, battery-powered apparatus with a display to convey credentials to the user. Often, the apparatus has a button to trigger the credential generation process; sometimes, there is a keypad for entering PIN codes, challenges, transaction data, etc. Some strong authentication tokens are adapted to receive an external key storage medium such as a smart card. The cryptographic generation of credentials may be performed by an appropriately programmed processor or microcontroller, or by dedicated hardware such as an Application-Specific Integrated Circuit (ASIC) or Field-Programmable Gate Array (FPGA). All these features are design options that may or may not be present in particular embodiments of the present invention.

Figure 1:
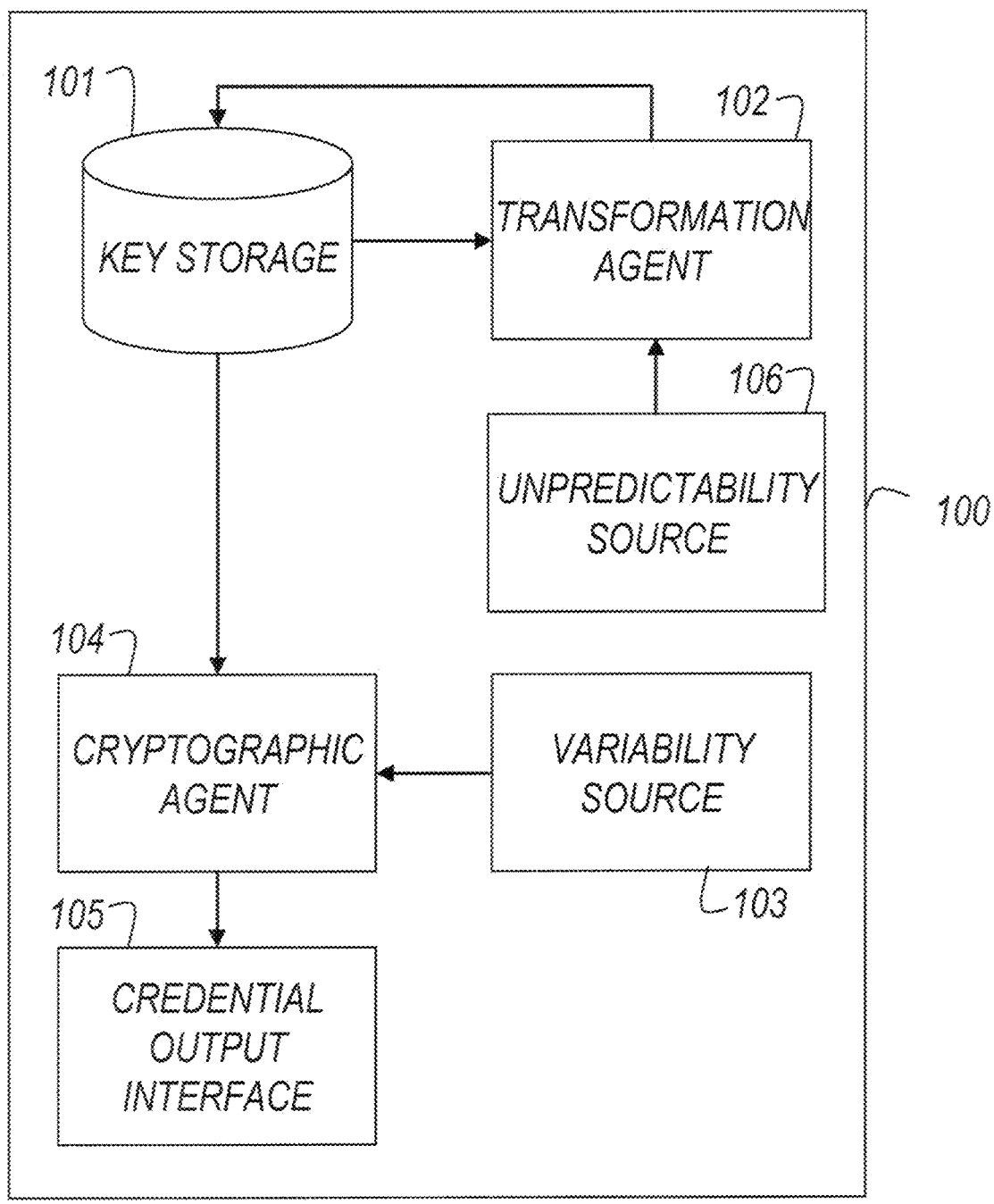
FIG. 1 illustrates a strong authentication token 100 in accordance with one embodiment of the invention.

In a preferred embodiment of the apparatus of the present invention, as illustrated in FIG. 1, the apparatus is a strong authentication token 100, comprising a secret key storage 101. A secret key from storage 101 is used in the generation of credentials. A key transformation agent 102 applies one of a limited set of transformations to said secret key between successive credential generations using a source of unpredictability 106 to select one transformation of the set. Credentials are generated by the cryptographic agent 104, which further uses a time, counter, or challenge value provided by a clock, counter, or input interface shown as variability source 103. Generated credentials are provided to the end user through credential output interface 105. The secret key storage 101 may comprise volatile memory, such as the memory of a processor or microcontroller already present in the token, or a separate random access memory (RAM) component, whereby this memory is permanently powered by a battery to prevent loss of the stored data. Alternatively, the secret key storage 101 may be persistent memory such as a flash memory component.

Preferably, the transformation agent 102 selects said transformation that it applies to said secret key from of a limited set of allowed transformations randomly, pseudo-randomly or in some other way that is unpredictable in a practical sense. Said transformation agent 102 may select said transformation by listing the allowed transformations in a certain order and picking the $k^{th}$ transformation in the list where k is the value of an unpredictable number modulus the number of allowed transformations. Techniques to generate unpredictability are well-known in the art. In one embodiment said transformation agent 102 may comprise or have access to some source of unpredictability 106 such as a true hardware random number generator, e.g. based on thermal noise or electronic noise in an electrical circuit. In another embodiment said transformation agent 102 comprises a clock or counter and uses as a source of unpredictability the time difference or counter difference between events that are asynchronous or unrelated to said clock or counter. Said events may be for example the precise moments in time of certain user interactions with the device. In yet another embodiment transformation agent 102 comprises a pseudo-random number generator seeded with some secret data element. In still another embodiment, transformation agent 102 may use the content of data entered by the user, such as challenges provided by the server or even transaction related data, as unpredictable data. In that case, the confidentiality of said data entered by the user is preferably protected e.g. by exchanging at least some of said data over a secure channel such as for example a TLS or SSL connection.

The transformation agent 102 may be an appropriately programmed processor or microcontroller, or dedicated hardware such as an Application-Specific Integrated Circuit (ASIC) or Field-Programmable Gate Array (FPGA). Also cryptographic agent 104 may be an appropriately programmed processor or microcontroller, or dedicated hardware such as an Application-Specific Integrated Circuit (ASIC) or Field-Programmable Gate Array (FPGA). The transformation agent 102 and the cryptographic agent 104 may be implemented on the same hardware platform or on a different hardware platform.

In one embodiment, the token further comprises an input interface 103, such as a human interface device or a machine-to-machine interface, adapted to receive challenges and/or transaction data, said challenges and/or transaction data being used to derive a dynamic value. The human interface device may comprise a keypad. In another embodiment the token includes a credential output interface 105, such as a human interface device or a machine-to-machine interface, adapted to output a generated credential. The human interface device may comprise a visual output device, such as a display, or an audible output device, such as a source of synthesized speech. The machine-to-machine interface of input interface 103 or credential output interface 105 may comprise a USB, Ethernet, serial, or other wired interface, or a Bluetooth, WiFi, cellular or other wireless interface.

In one class of embodiments of the apparatus 100 of the present invention, credentials are generated using a dynamic value. In a preferred embodiment, the token 100 further comprises a clock 103, and the dynamic value is a time value derived from the clock's time value. In another embodiment, the token 100 further comprises a counter 103, such as a register that is incremented upon every generation of a credential, and the dynamic value is derived from the present counter value. In yet another embodiment, the token further comprises an input interface 103, such as a human interface device or a machine-to-machine interface, adapted to receive challenges and/or transaction data, said challenges and/or transaction data being used to derive a dynamic value. Preferably, the token 100 is capable of generating credentials using both a time value and a received challenge and/or transaction data.

Figure 2:
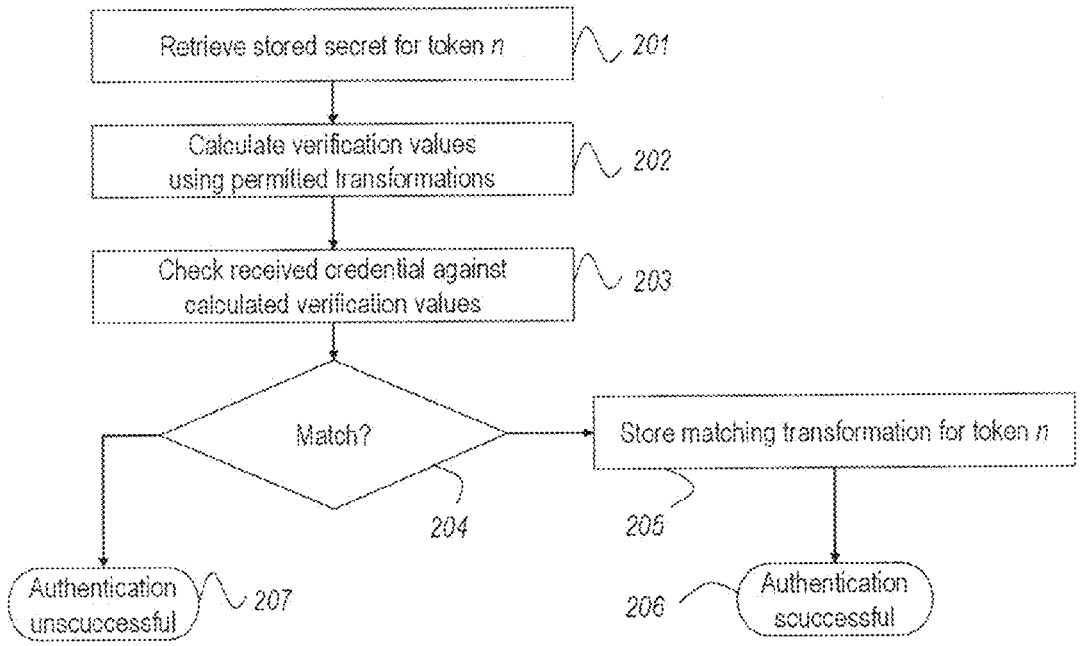
FIG. 2 illustrates a method according to the present invention.

An embodiment of the method of the present invention which receives a credential based on a transformed secret and derives the transformed secret, is illustrated in FIG. 2. Typically the method of FIG. 2 could be performed by a server to authenticate a credential supplied to the server by a user and obtained by the user from a token. Preliminarily, the stored secret for the token that needs to be authenticated is retrieved at step 201. The method comprises calculating (step 202) the verification values corresponding to the different permitted transformations of the stored secret; checking (step 203) the received credential against each of these verification values; determining (step 204) which one, if any, of the verification values yielded a match; if successful, storing (step 205) the matching transformation as the new secret for the token under authentication and returning (step 206) a successful authentication outcome; if unsuccessful, returning (step 207) an unsuccessful authentication outcome.

Figure 3:
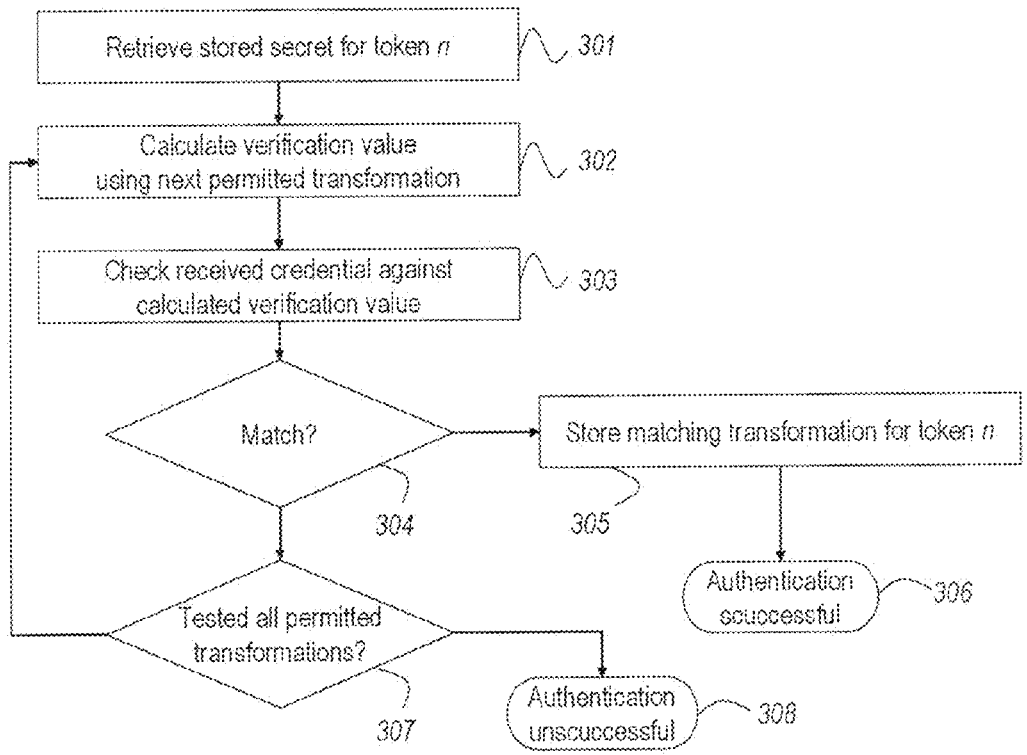
FIG. 3 illustrates a variation of the method according to the present invention.

Another embodiment of the method of the present invention which receives a credential based on a transformed secret and derives the transformed secret, is illustrated in FIG. 3. Preliminarily, the stored secret for the token that needs to be authenticated is retrieved (step 301). The method comprises calculating (step 302) the verification value corresponding to the first of the permitted transformations of the stored secret; checking (step 303) the received credential against this first verification value; determining (step 304) if the calculated verification value yields a match; if successful, storing (step 305) the matching transformation as the new secret for the token under authentication and returning (step 306) a successful authentication outcome; if unsuccessful, checking (step 307) if there are remaining permitted transformations; if not, returning (step 308) an unsuccessful authentication outcome; if so, repeating steps 302 and following for the next permitted transformation.

In one class of embodiments of the method of the present invention, verification values are generated using a dynamic value. In a preferred embodiment, the dynamic value is a time value derived from a clock. In another embodiment, the dynamic value is derived from the present value of a counter. In yet another embodiment, the dynamic value comprises a challenge and/or data related to a transaction or a session.

The person skilled in the art will appreciate that there are many ways in which an initially generic key can be transformed, so that subsequent transformations lead to unpredictable and preferably highly different results. One relatively simple way to devise a set of permitted transformations in the sense of the present invention, is to designate a small number of fixed terms, one of which is appended or added by means of a binary XOR operation to the presently valid version of the secret, after which the result is hashed or scrambled with a well-known hashing function. The number of permitted transformation values at each transformation equals the number of fixed terms that can be chosen. Another way is to simply randomly select and flip one bit of the secret. This way the secret will effectively perform a kind of random walk through key space. At each transformation the number of permitted transformation values equals the number of bits in the secret. Yet another way is to consider all bits of the secret in a fixed order and at each transformation decide at random whether the bit under consideration is being changed or not. At each transformation there are two permitted transformation values. This way the value of the secret will be completely independent of the initial value of the secret after a number of transformations that equals the number of bits in the secret. A variant is to consider at each transformation not just one bit at a time but rather (small) groups of bits, for example 2 or 3 bits at once, and decide for each bit of the group under consideration whether to change it or not. In that case the number of permitted transformation values at each transformation equals 2 to the power of the number of bits that can be changed at each transformation.

While various embodiments of the present invention have been described above, it should be understood that they have been presented by way of example only, and not limitation. Thus, the breadth and scope of the present invention should not be limited by any of the above described exemplary embodiments but should be defined only in accordance with the following claims and their equivalents.

The invention claimed is:

1. An apparatus comprising:
a storage device for storing a current value of a secret key, said secret key for use in the generation of a cryptographic value,
a key transformation agent configured to:
randomly select a secret key transformation from a predetermined set of permitted transformations to produce a transformed secret key in an unpredictable way such that the selection is known only to the apparatus and is unknown to any authentication verifiers; and
apply the selected secret key transformation to the current value of said secret key; and
update the current value of said secret key stored in said storage device to the transformed value of the secret key; and
a cryptographic agent configured to generate said cryptographic value using the current value of said secret key stored in said storage device.

2. A strong authentication token comprising an apparatus of claim 1 wherein said cryptographic agent generating said cryptographic value using the current value of said secret key comprises said cryptographic agent generating an authentication credential by cryptographically combining the current value of said secret key with a dynamic value.

3. The token of claim 2, further comprising a clock, wherein said authentication credential comprises a one-time password and wherein said dynamic value comprises a time value derived from said clock.

4. The token of claim 2, further comprising a counter, wherein said authentication credential comprises a one-time password and wherein said dynamic value is derived from the value stored by said counter.

5. The token of claim 2 or claim 3 or claim 4, further comprising a data input interface, wherein said generation of credentials uses data received from a user of the token through said data input interface.

6. The token of claim 5, wherein said data received through said data input interface comprises transaction data.

7. The token of claim 5 wherein said data received through said data input interface comprises a challenge.

8. The apparatus of claim 1 further adapted to ensure that after said key transformation agent has done a first update of the current value of the secret key a minimum number of cryptographic values are generated by said cryptographic agent before said key transformation agent does a next update of the current value of the secret key.

9. The apparatus of claim 1 further adapted to enforce that a minimum time interval elapses between any two consecutive transformations of the secret key.

10. The apparatus of claim 1 adapted to be personalized by the user manually entering a key seed.

11. The apparatus of claim 1 further adapted so that the key transformation agent no longer updates the value of the secret key in an unpredictable way after a predetermined condition has been met.

12. A method for authenticating a credential received from a user, comprising,
configuring at least one processor to perform the functions of:
storing a secret,
generating a plurality of verification values whereby each of said verification values is cryptographically generated using a respective selected transformation from a predetermined set of known permitted transformations of said stored secret,
receiving a credential that has been cryptographically generated using the secret, the secret having been randomly transformed in an unpredictable way from a prior secret by randomly selecting one transformation from said predetermined set of permitted transformations, wherein the selection is known only to the selector and is unknown to any authentication verifiers,
determining whether said credential matches one of said plurality of verification values, and, if said credential matches one of said plurality of verification values, updating the stored secret as transformed by the corresponding one of said set of known permitted transformations.

13. The method of claim 12, wherein said generation of verification values uses a dynamic value.

14. The method of claim 13, wherein said dynamic value is a time value derived from a clock.

15. The method of claim 13, wherein said dynamic value is derived from a counter value.

16. The method of claim 13 or claim 14 or claim 15, wherein said generation of verification values uses data pertaining to a transaction.

17. The method of claim 13 or claim 14 or claim 15, wherein said generation of verification values uses data representing a session.

18. A method to safely communicate a transformed secret from a first entity storing a value of a secret to a second entity also storing the value of said secret prior to said transformation, to allow the second entity to determine the transformed secret, said method comprising:

configuring a first processor of the first entity to perform the functions of:

randomly selecting in an unpredictable way a transformation for said stored secret from a predetermined set of permitted transformations to produce a transformed secret such that said selection is known only to said first entity and is unknown to said second entity;

replacing the current value of said secret stored by the first entity with the transformed secret; generating a cryptographic value with the current value of said secret; and submitting said cryptographic value to said second entity; and configuring a second processor of the second entity to perform the functions of:

receiving said cryptographic value from said first entity;

generating a number of candidate secrets by applying transformations from said predetermined set of permitted transformations to said secret stored by said second entity;

cryptographically generating plural verification values using for each verification value a respective one of the candidate secrets;

comparing at least one of said verification values with said cryptographic value; and, if one of said verification values matches said received cryptographic value, retaining as the value of said stored secret the candidate secret used in cryptographically generating the verification value matching the cryptographic value received from the first entity whereby the first and second entity store the value of the transformed secret.

19. The method of claim 18, wherein the first processing component is further adapted so that after a first transformation of the secret key by the first processing component a minimum number of cryptographic values are generated by the first processing component before a next transformation of the secret key by the first processing component.

20. The method of claim 18, wherein the first processing component is further adapted so that a minimum time interval elapses between any two consecutive transformations of the secret key by the first processing component.

21. A method to safely update at a second entity the value of a secret shared by said second entity and a first entity and transformed by said first entity, said method comprising:

configuring at least one processor to perform the functions of:

receiving at the second entity a cryptographic value from the first entity, said cryptographic value having been derived by said first entity from said transformed secret, where the transformed secret has been randomly generated by said first entity in an unpredictable way by randomly selecting one transformation from a predetermined set of permitted transformations and applying the selected one transformation to a secret shared by the first and second entity, wherein said selection is known only to said first entity and is unknown to said second entity, generating at the second entity plural verification values using different candidate secrets, where the candidate secrets are derived from the stored secret transformed by different ones of the limited set of permitted transformations, comparing at the second entity at least one of said verification values with said cryptographic value; and, if one of said verification values matches said cryptographic value, retaining at the second entity as said stored secret the candidate secret used in obtaining the verification value matching the cryptographic value received from the first entity whereby the second entity stores the transformed secret.

22. The method of claim 18 wherein said cryptographic value comprises an authentication credential.

23. The method of claim 22 wherein the generation of said authentication credential comprises cryptographically combining said secret with the value of a dynamic variable.

24. The method of claim 23 wherein said first entity comprises a strong authentication token and wherein said authentication credential comprises a one-time password and wherein said dynamic variable is time-related or related to a counter maintained by the strong authentication token.

25. The method of claim 23 wherein said first entity comprises a strong authentication token and wherein said authentication credential comprises a response and wherein said dynamic variable is related to a challenge.

26. The method of claim 22 wherein said first entity comprises a strong authentication token and wherein said authentication credential comprises an electronic signature and wherein the generation of said electronic signature comprises cryptographically combining said secret with transaction data to be signed.

* * * * *